United States Patent

[11] 3,581,580

| [72] | Inventor | Henry H. Harada<br>Grand Blanc, Mich. |
|---|---|---|
| [21] | Appl. No. | 876,731 |
| [22] | Filed | Nov. 14, 1969 |
| [45] | Patented | June 1, 1971 |
| [73] | Assignee | General Motors Corporation<br>Detroit, Mich. |

[54] VEHICLE SPEED TRANSDUCER ASSEMBLY FOR A VEHICLE ROAD SPEED CONTROL SYSTEM
5 Claims, 3 Drawing Figs.

[52] U.S. Cl. .................................................. 73/519,
73/521, 180/108
[51] Int. Cl. .................................................. G01p 3/49
[50] Field of Search ......................................... 73/519,
521, 530; 180/105, 108

[56] References Cited
UNITED STATES PATENTS

| 3,087,340 | 4/1963 | McMurray et al. | 180/108 |
| 3,340,952 | 9/1967 | Day | 73/519X |
| 3,441,104 | 4/1969 | Hagler | 73/519X |

Primary Examiner—James J. Gill
Attorneys—W. E. Finken and D. D. Mc Graw

ABSTRACT: A speed transducer having an eddy current coupling speed sensor with the vehicle speed driven magnet rotating about one axis and the drag plate moving arcuately about another axis parallel thereto, the drag plate having a control valve movable to modulate an atmospheric air inlet port to a pneumatically operated vehicle road speed control system. A self-tracking arrangement is provided by including as a part of the transducer a balancing servomotor actuated by control pressure and controlling the tension on a tracking pring connected to the modulating valve.

INVENTOR.
Henry H. Harada
BY
D. D. McGraw
ATTORNEY

VEHICLE SPEED TRANSDUCER ASSEMBLY FOR A VEHICLE ROAD SPEED CONTROL SYSTEM

The invention relates to a vehicle speed transducer and more particularly to one in which an eddy current speed sensor is utilized. A control valve for modulating atmospheric air into a vacuum operated road speed control system is moved by a drag plate having a different axis from the axis of the eddy current coupling magnet. The transducer includes a balancing servomotor subject to control pressures generated in response to modulating action of the control valve to provide a self-tracking mechanism. The speed transducer generates a control signal, when energized, which varies with vehicle speed error in relation to a vehicle speed set by establishing the force exerted by the tracking spring at the time of energization of the system. The control pressure is transmitted to a servomotor which acts on the throttle linkage to control the vehicle engine throttle valve and thereby maintain a substantially constant vehicle speed.

IN THE DRAWINGS

Figure 1:
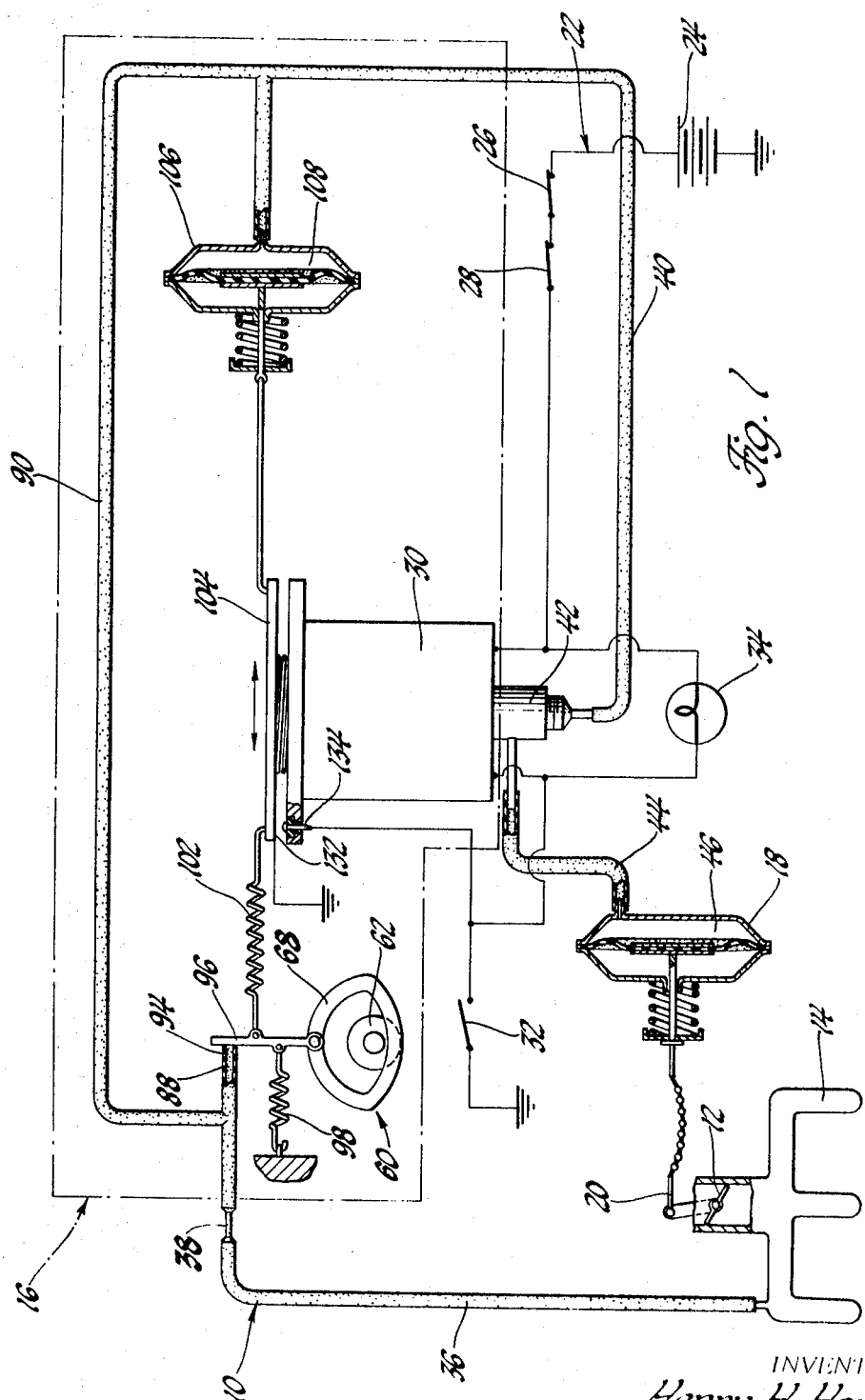
FIG. 1 is a schematic representation of a vehicle road speed control system embodying the invention, with parts broken away and in section.

The vehicle road speed control system 10 includes a vehicle throttle valve 12 controlling the vehicle engine which has an intake manifold 14, a speed transducer assembly 16 embodying the invention, a servomotor 18 connected through throttle linkage 20 to the throttle valve 12, and an electrical control circuit 22. This circuit has a source of electrical energy schematically illustrated as battery 24 and connected in series to the ignition switch 26, a normally closed brake switch 28, the locking solenoid 30 of the speed transducer assembly 16, and the normally open engage switch 32. An indicator lamp 34 is shown as being connected in parallel with locking solenoid 30 so that it is also energized when the solenoid is energized.

The pneumatic circuit for the system includes the engine intake manifold 14 as a source of vacuum, connected by conduit 36 through a restrictive orifice 38 to the speed transducer assembly 16. Another conduit 40 connects the speed transducer assembly 16 through an on-off valve 42, which is shown as being controlled by energization of solenoid 30, to conduit 44 and the variable pressure chamber 46 of the servomotor 18.

Figure 2:
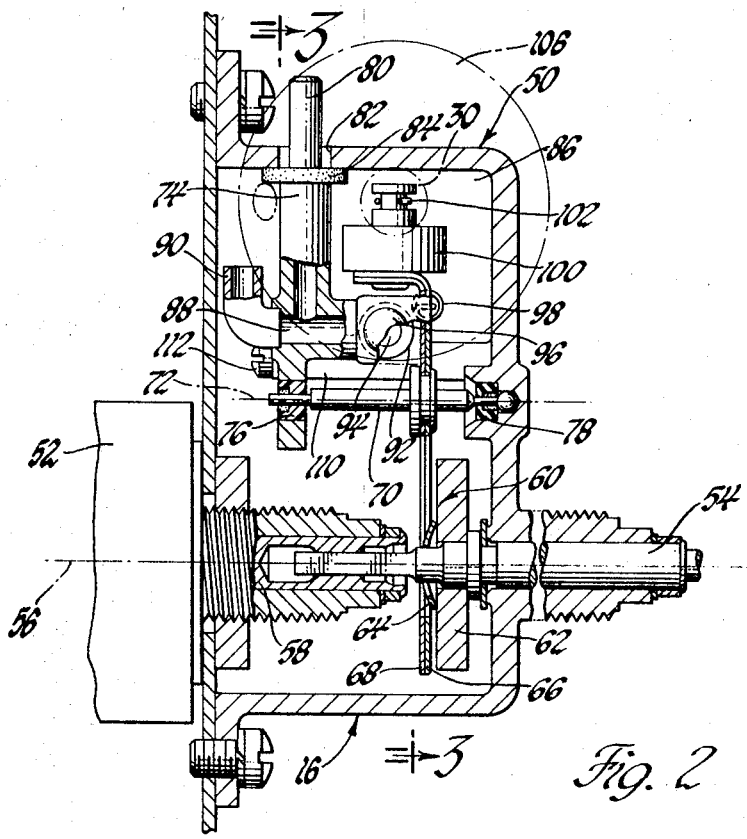
FIG. 2 is a cross section view of the speed transducer assembly of FIG. 1, with parts broken away.
Figure 3:
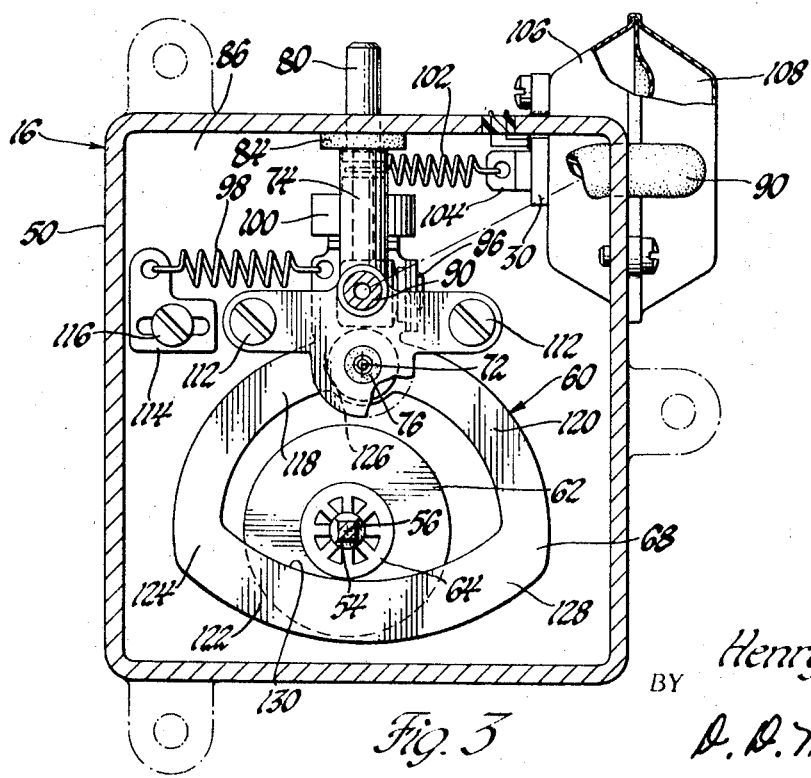
FIG. 3 is a section of the speed transducer assembly of FIG. 2, taken in the direction of arrows 3—3 of that figure.

The speed transducer assembly 16 has portions thereof shown schematically in FIG. 1 and shown mechanically in FIGS. 2 and 3. The assembly has a housing 50 which is illustrated as being suitably mounted to the back of speedometer 52. The assembly has a drive shaft 54 suitably driven in accordance with vehicle road speed. In the usual installation, this drive is by means of a speedometer cable. Drive shaft 54 is mounted for rotation in housing 50 about an axis 56 and directly drives the speedometer drive shaft 58. This provides a single axis drive through the housing 50. An eddy current coupling 60 is provided to generate a vehicle road speed signal. The coupling includes the magnet 62 which is secured on shaft 54 for rotation therewith. It is retained on the shaft by retainer 64. An arcuately movable eddy current responsive member comprising a drag plate 66 and a field plate 68 is positioned adjacent magnet 62 so as to be affected by the magnetic force of the rotation magnet. This member will be hereafter referred to as the drag plate 66 although it is to be understood that it normally includes the field plate as well. Drag plate 66 is mounted on a shaft 70 for arcuate movement about axis 72. Axis 72 is parallel to axis 56 but is spaced from it so that the drag plate does not move about the same axis as does the magnet 62. A body 74 and a portion of housing 50 are provided with suitable bearings 76 and 78, respectively, in which shaft 70 is mounted.

Body 74 is positioned within housing 50 and includes a tube 80 to which conduit 36 is connected. Tube 80 extends outwardly through the enlarged atmospheric air inlet opening 82 and mounts an air filter 84 which filters atmospheric air entering the chamber 86 of housing 50 through opening 82. Body 74 has a passage 88 connecting with tube 80 and also with conduit 90. One end of passage 88 is formed to provide a valve seat 92 surrounding the atmospheric air inlet port 94. A control valve 96 is mounted on drag plate 66 so that it may seat against valve seat 92 to close inlet port 94. Valve 96 is also movable arcuately about axis 72 to modulate the atmospheric air entering the pneumatic circuit through port 94. A drag plate output balancing spring 98 is operatively attached to valve 96 and drag plate 66 and urges valve 96 toward engagement with its seat 92. A balance weight 100 is also secured to drag pate 66 on the opposite side from the portion of the drag plate adjacent magnet 62 so as to maintain the drag plate assembly, including valve 96, in a balanced condition about axis 72. Valve 96 may be considered to be a part of the weight-balancing drag plate 66. The tracking spring 102 is secured at one end to balance weight 100 and acts in opposition to balancing spring 98. The other end of tracking spring 102 is secured to the output member 104 of the balancing servomotor 106. This servomotor has a variable pressure chamber 108 to which conduit 90 is also connected. Conduit 90 is furthermore suitably arranged for fluid connection to conduit 40 of the system. The locking solenoid 30 is positioned about or adjacent member 104 and holds that member against movement by servomotor 106 when the solenoid is energized.

Body 74 is mounted by suitable posts 110 and screws 112 in the housing 50. The other end of balancing spring 98 is connected to a spring calibration and mounting plate 114 which is adjustably mounted by screw and slot arrangement 116 to the housing 50 so that the tension on spring 98 may be calibrated and set.

The drag plate 66 is generally triangular in conformation and is illustrated as having curved sides 118, 120 and 122 joining the vertices 124, 126 and 128. The drag plate has an opening 130 defined by the sides 118, 120 and 122 through which the drive shaft 54 extends. The drag plate mounting shaft 70 is positioned at vertex 126. Thus, the curved side 120 is positioned on the opposite side of axis 56 from axis 72 and is the portion of the drag plate affected by rotation of magnet 62. Side 120 is formed as an arc having a radius substantially greater than the distance between vertex 126 and vertices 124 and 128. This arrangement of having the drag plate axis offset from the magnet axis not only permits the use of an in-line drive shaft, but also utilizes a higher mechanical advantage to obtain higher torque at axis 72. This is accomplished by having the driven side 120 of the drag plate positioned at the furthest point from the axis 72 of the drag plate positioned at the furthest point from the axis 72 of the drag plate mounting shaft. Because of the high torque output at valve 96, this valve can be directly attached to the drag plate.

When the system is in the deenergized condition, on-off valve 42 is closed. The tracking servomotor is responsive to control pressure in passage 88, which is fluidly intermediate restrictive orifice 38 and port 94. It therefore continually adjusts the tension on tracking spring 102 against the tension of balancing spring 98 as vehicle road speed changes. When solenoid 30 is energized, member 104 is locked in position and the tension on tracking spring 102 is set to correspond to the vehicle speed at that time. This provides the desired speed setting. At the same time, valve 42 is opened and control pressure is transmitted to servomotor 18. The servomotor acts through linkage 20 to position the throttle valve in accordance with control pressure to maintain the desired vehicle speed. Valve 96 modulates the entry of atmospheric air into the pneumatic circuit to establish the control pressure. The system is deenergized by opening the ignition switch 26 or the brake switch 28. This will open the holding circuit contacts 132 and 134 schematically illustrated in FIG. 1.

What I claim is:
1. A vehicle speed transducer comprising:
   a drive shaft having a vehicle speed input and a speedometer drive output, a magnet mounted on said drive shaft and rotatably driven thereby in accordance with vehicle speed about a first axis, a drag plate mounted for arcuate movement about a second axis parallel to and in spaced relation to said first axis, a control valve connected to and movable by said drag plate and having a fixed valve seat through which a port opens, a drag plate balancing urging said drag plate in an arcuate direction tending to close said control valve against said valve seat and opposing drag plate movement responsive to rotation of said magnet, a balancing servomotor having a variable pressure chamber in fluid communication with said valve seat port and controlled by pressure variations controlled by said control valve, a balancing servomotor output member including a servomotor output balancing spring connected to said control valve and acting in opposition to said drag plate balancing spring, and means for setting the force exerted by at least one of said springs at a desired value reflecting a desired vehicle speed.

2. The vehicle speed transducer of claim 1, said drag plate being positioned on the side of said second axis toward and beyond said first axis, and means on said drag plate extending away from said first axis and balancing said drag plate.

3. The vehicle speed transducer of claim 2, said balancing means including said control valve.

4. The vehicle speed transducer of claim 1, said drag plate being generally triangular and having an opening therein through which said drive shaft extends, said second axis extending through said generally triangular drag plate at one of the vertices thereof.

5. The vehicle speed transducer of claim 4, said generally triangular drag plate having the side thereof opposite the one vertex formed as an arc having a radius substantially greater than the distance between the one vertex and the other two vertices, sad arcuate side being positioned adjacent said magnet and driven thereby.

PO-1050
(5/69)

UNITED STATES PATENT OFFICE
CERTIFICATE OF CORRECTION

Patent No. __3,581,580__      Dated __June 1, 1971__

Inventor(s) __Henry H. Harada__

It is certified that error appears in the above-identified patent and that said Letters Patent are hereby corrected as shown below:

In the ABSTRACT - on the last line, the word "pring" should read -- spring --

Column 1, line 27, after the word "section" insert -- view --

Column 1, line 65, the word "rotation" should read -- rotating --

Column 2, line 14, the word "pate" should read -- plate --

Column 2, line 50, after the word "plate" delete the repeated words -- positioned at the furthest point from the axis 72 of the drag plate --

Column 3, line 8, after the word "balancing" insert the word -- spring --.

Signed and sealed this 26th day of October 1971.

(SEAL)
Attest:

EDWARD M. FLETCHER, JR.      ROBERT GOTTSCHALK
Attesting Officer               Acting Commissioner of Patents